United States Patent [19]
Floury et al.

[11] Patent Number: 5,963,845
[45] Date of Patent: *Oct. 5, 1999

[54] SATELLITE PAYLOAD WITH INTEGRATED TRANSPARENT CHANNELS

[75] Inventors: Gérard Floury, Toulouse; Jean-Philippe Gazda, Le Fauga; Bernard Rivierre, Le Chalet; Michel Tatard, Toulose, all of France

[73] Assignee: Alcatel Espace, Nanterre Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/561,247

[22] Filed: Nov. 21, 1995

[30] Foreign Application Priority Data

Nov. 24, 1994 [FR] France .................. 94 14100

[51] Int. Cl.$^6$ .................................................. H04B 7/185
[52] U.S. Cl. ........................... 455/12.1; 455/22; 455/103
[58] Field of Search .................. 455/12.1–13.4, 455/20, 22, 103, 427, 430

[56] References Cited

U.S. PATENT DOCUMENTS

| | | | |
|---|---|---|---|
| 3,810,255 | 5/1974 | Wachs et al. | 455/20 |
| 4,002,980 | 1/1977 | Herz . | |
| 4,941,200 | 7/1990 | Leslie et al. | 455/20 |
| 5,287,543 | 2/1994 | Wolkstein | 455/103 |
| 5,613,197 | 3/1997 | Copeland et al. | 455/12.1 |

OTHER PUBLICATIONS

Shigekazu Hori, "GaAs Monolithic MIC's for Direct Broadcast Satellite Receivers", 1983 IEEE, pp. 1089–1096.
H. Gaugig et al, "Das Repater–Unersystem der Nutzlast des FS Kopernikus", *Ant Nachrichtentechnische Berichte*, No. 7, Oct. 1990, Backnang, DE; pp. 31–41, XP234665.
L. Friederichs, "Die Nutzlast des DFS–Kopernikus–Raumsegments", *Ant Nachrichtentechnische Berichte*, No. 7, Oct. 1990, Backnang, DE; pp. 23–30, XP234664.
F. Ananasso et al, "On–Board Technologies for User–Oriented SS–FDMA Satellite Systems", *IEEE International Conference on Communications*, vol. 1, Jun. 1987, Seattle US, pp. 244–248.
C. Loo et al, "Double–Hop on Board Signal Processing Using Olympus", *IEEE Globecom Conference*, vol. 1, Dec. 1993, Houston, US, pp. 599–603.

*Primary Examiner*—Nguyen Vo
*Attorney, Agent, or Firm*—Sughrue, Mion, Zinn, Macpeak & Seas, PLLC

[57] ABSTRACT

A satellite payload having d transparent channels, a first plurality d of band-pass channel filters IMUX of bandwidth δ that filter received signals, frequency converters, a plurality k of channel amplifiers (k≧d), power amplifiers and a second plurality p of channel filters OMUX that filter the signals amplified by the channel amplifiers and the power amplifiers, d amplifiers assigned to said d channels, the frequency converters including at least one mixer and at least one source of a conversion frequency signal, wherein the g band-pass channel filters IMUX filter the received signals before frequency conversion by the converters.

22 Claims, 9 Drawing Sheets

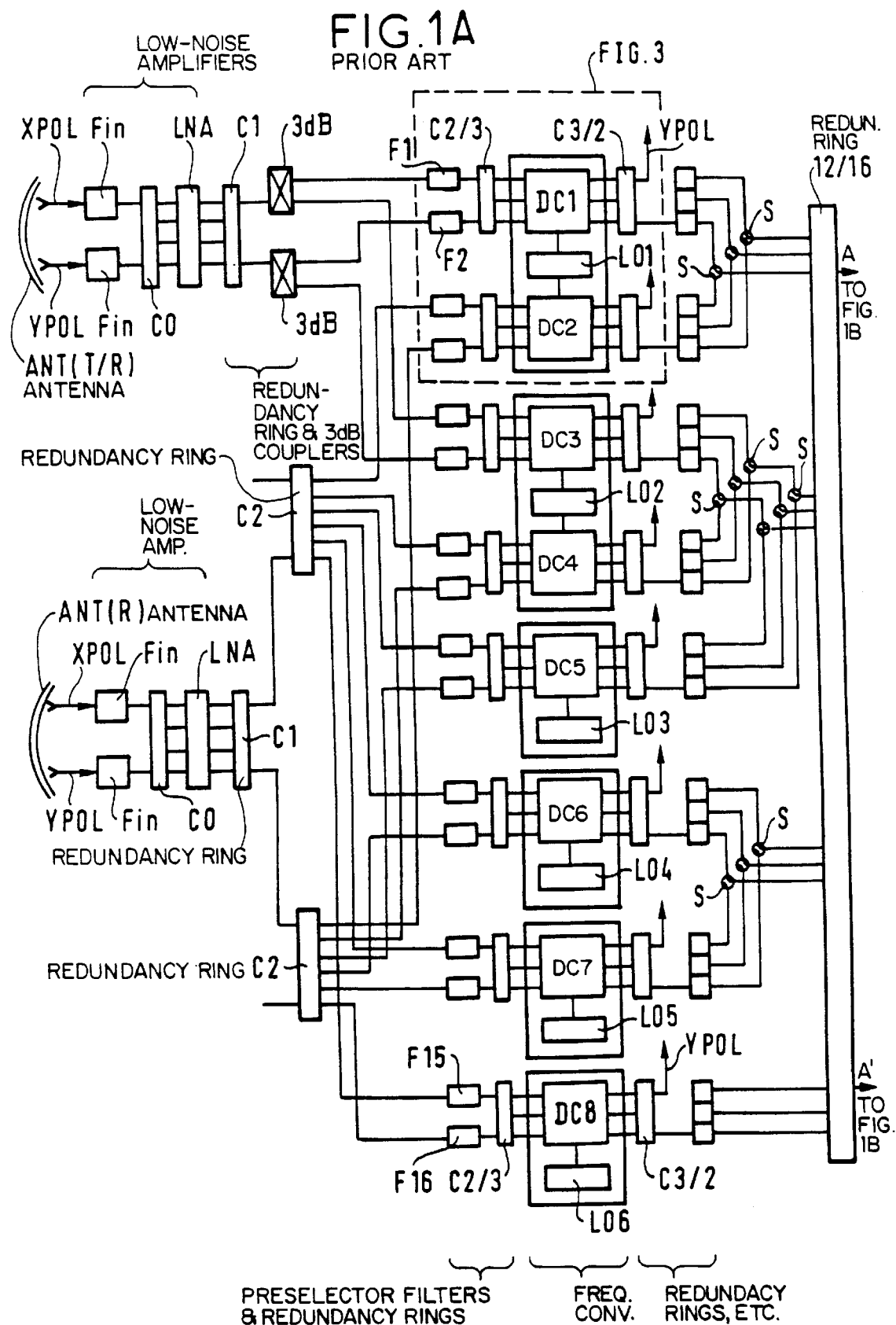

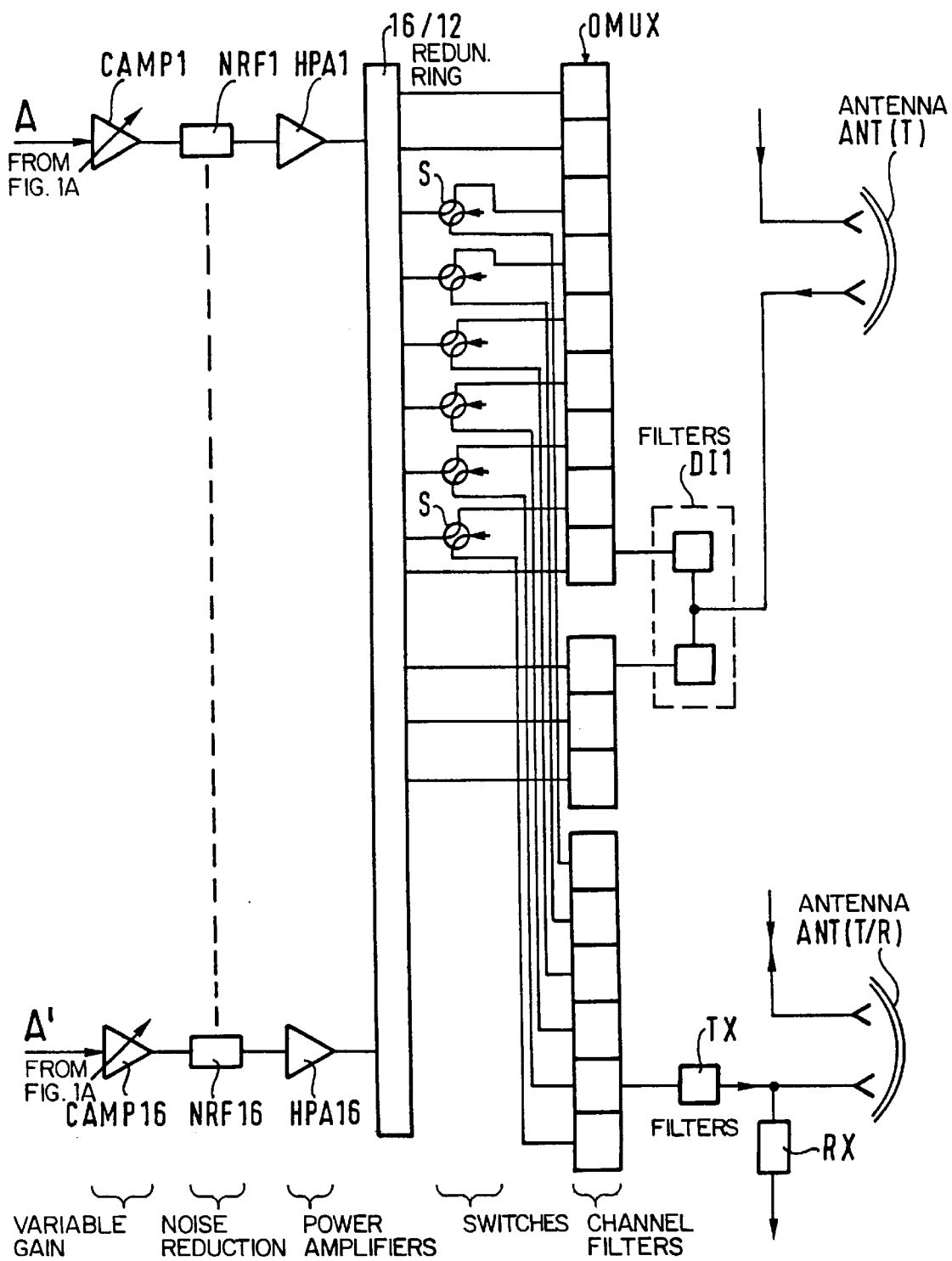

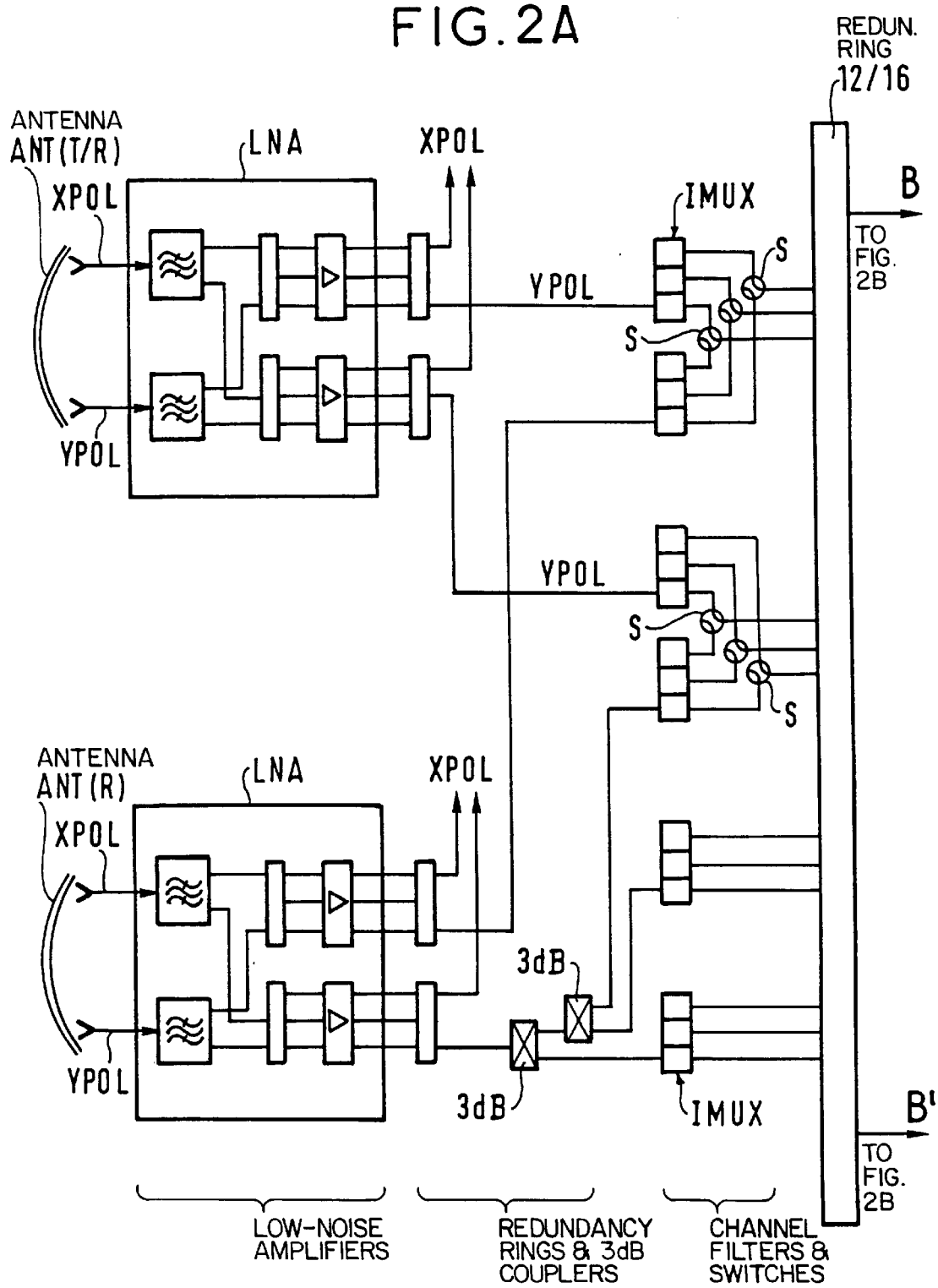

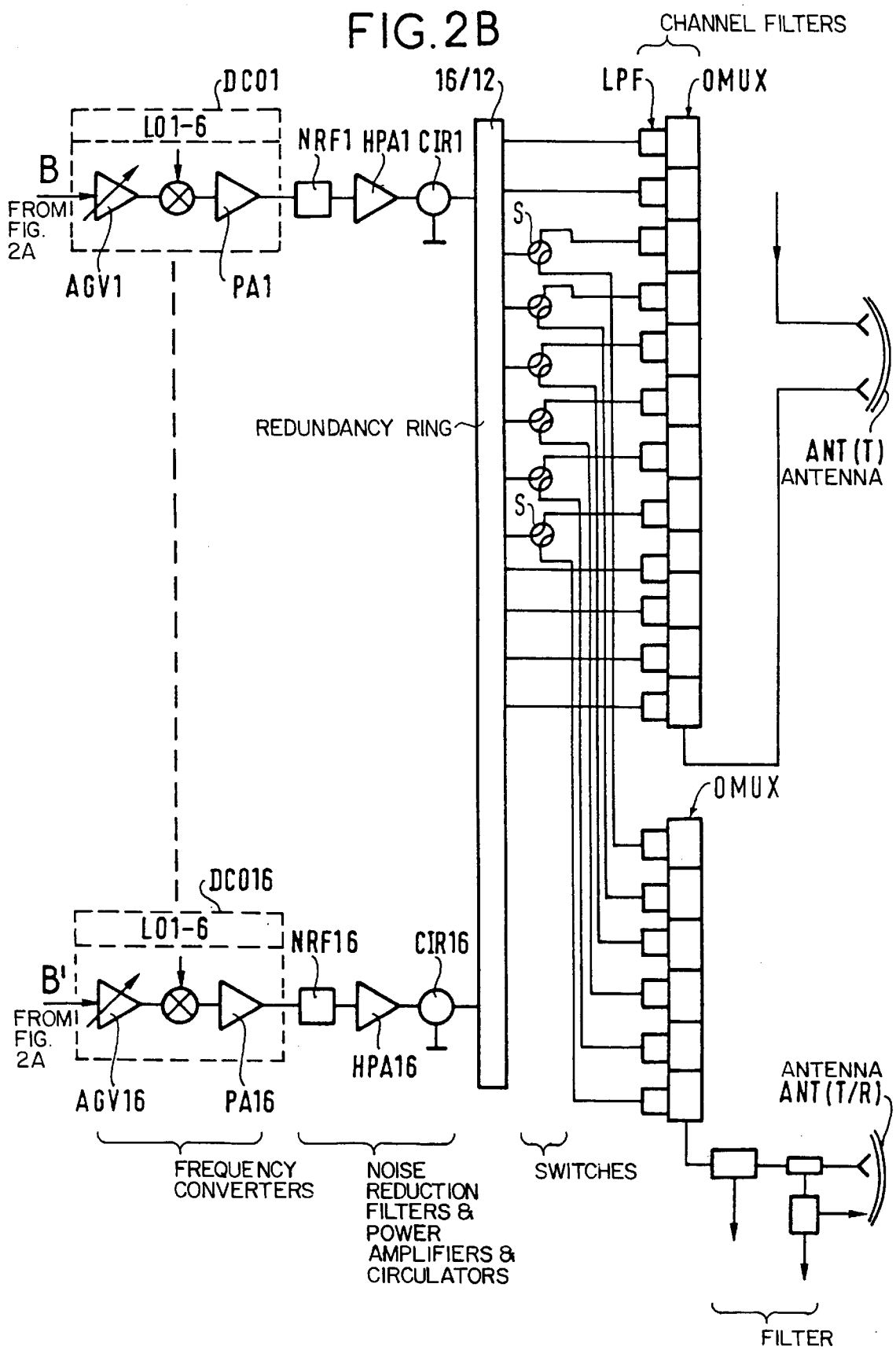

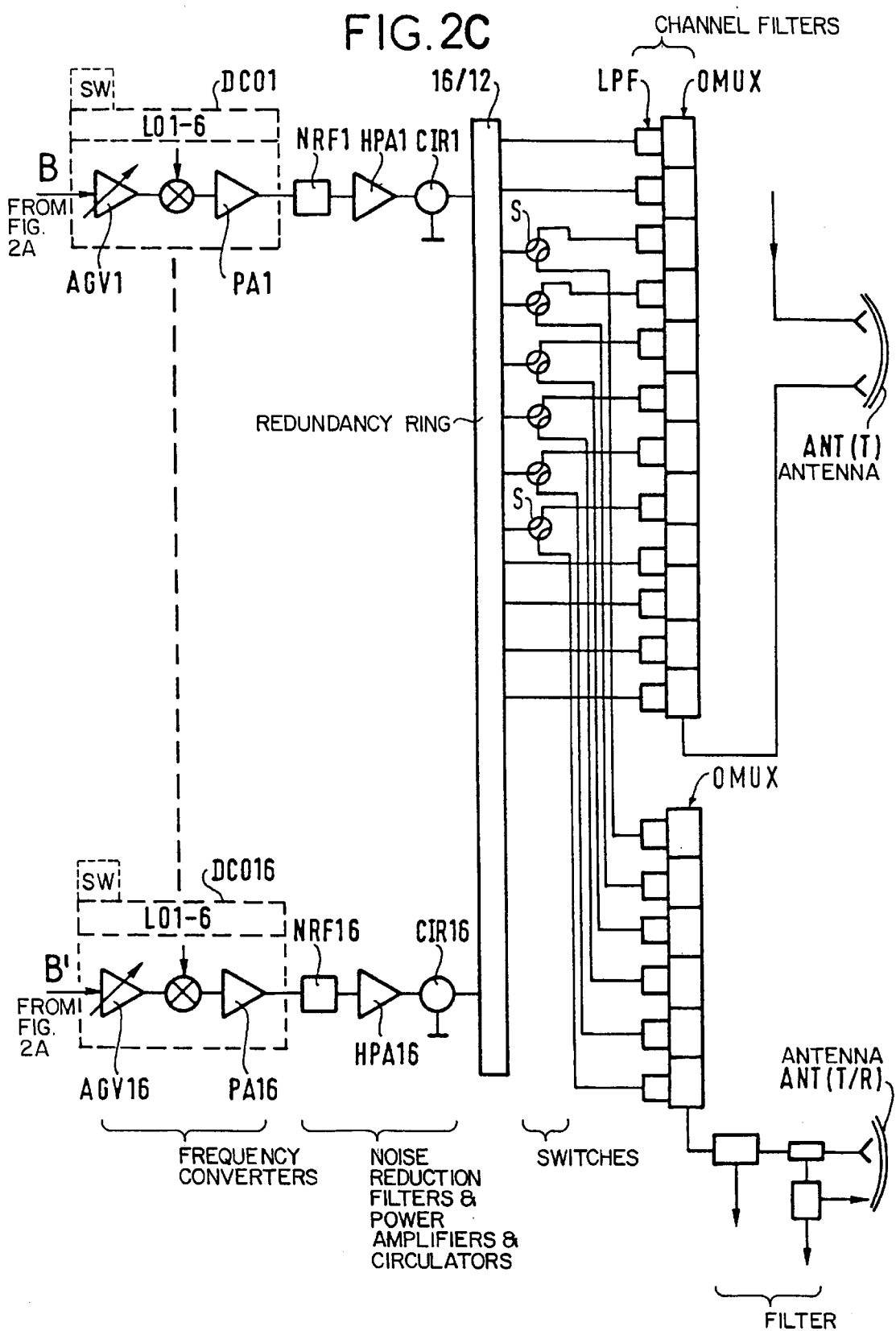

SATELLITE PAYLOAD WITH INTEGRATED TRANSPARENT CHANNELS

BACKGROUND OF THE INVENTION

The field of the invention is that of telecommunication satellites. To be more precise, the invention concerns onboard payloads that comprise a plurality of transponders capable of receiving microwave signals from the Earth and transmitting microwave signals to the Earth.

Most existing telecommunication satellites are "transparent" as far as the user is concerned. In this case the resources of the payload are shared between a plurality of separate channels that can be assigned to users on the ground, either at the rate of one channel per user, at least during its use, or at the rate of one channel shared between several users, for example using a time-division multiple access (TDMA) frame or code division multiple access (CDMA) spread spectrum transmission.

A channel is conventionally defined by a center frequency and a bandwidth about that frequency. The transmit frequency is usually different from the receive frequency for a given channel, and there is therefore at least one frequency conversion between the signals received from the Earth and the signals transmitted to the Earth. For a Ku band transponder, for example, the uplinks are at (reception) frequencies around 14 GHz and the downlinks are at frequencies around 12 GHz.

As changes in the satellite telecommunications market track changes in technology, payloads are including increasingly large numbers of transponders, in order to serve a greater number of users simultaneously.

Also, use of the radio frequency spectrum being subject to the pressure of ever increasing demand, payloads must be designed to carry the maximum number of channels simultaneously over virtually all of the frequency band allocated by the international agencies. A consequence of this trend is an increase in the number of different frequency conversions required on the satellite for the latter to fulfil its mission.

For example, to be able to use four of the five 250 MHz transmit-receive sub-bands allocated by the ITU in the Ku band (each sub-band can carry three standard channels with a bandwidth of 72 MHz), six different conversion frequencies are required instead of the two needed in payloads of a previous generation. These multiple frequency changes within the same unit can give rise to a multiplicity of mixing spuriae that can in some cases lead to an unacceptable level of intermodulation between channels and in other cases to channels being "blocked" by interference due to these spuriae.

In a standard architecture several channels are subjected to frequency conversion conjointly, using the same local oscillator signal and, more importantly, the same mixer within the same frequency converter. The signals in the various channels that are transposed conjointly can have very different amplitudes, with differences up to 15 dB, which is important for protecting them against the mixing spuriae mentioned above.

Extrapolating an architecture of the previous generation is not satisfactory since the mass, the weight and the complexity of the standard architecture become prohibitive, as can be seen from FIGS. 1A and 1B.

FIG. 1A shows a first part of one example of a standard payload architecture for a large number of channels (24 channels in the example given, 12 with each polarization XPOL, YPOL). The figure shows the components of the payload for one polarization only, and parallel channels are provided for the cross-polarization YPOL starting from the frequency converter blocks DC1 ... DC8.

In very broad terms, a payload of this kind comprises, starting from the receive antenna(s): a low noise amplifier block (Fin, LNA); a block of 16 preselector filters (F1, F2, ..., F15, F16) to divide the received signals into frequency bands 250 MHz wide; eight blocks (DC1, ..., DC8) each of three frequency converters, representing a total of 24 converters, combined in a 3/2 redundancy ring; a second block of 24 channel filters that form a receive multiplexing block (also known as an input multiplexer IMUX); and a second 16/12 redundancy ring.

As mentioned above, the figure shows only the components of the payload for one polarization (XPOL), and parallel channels are provided for the cross-polarization YPOL starting from the frequency converter blocks DC1 ... DC8.

Note that each of the eight frequency converter blocks (DC1, ..., DC8) is fed by a local oscillator that generates the conversion frequency. These frequency converters are shown in more detail in FIG. 3, which corresponds to part of FIG. 1A. Each converter (DC1, DC2) processes a 250 MHz band comprising three contiguous 72 MHz channels. These channels are selected by the 250 MHz bandwidth preselector filter(s) (F1, F2, F3, F4, ... ) on the input side of the converter. In the example shown in FIG. 1A there are six different conversion frequencies for the eight blocks of converters, and therefore six local oscillators (LO1, LO2, ..., LO6).

FIG. 3 shows two frequency converters (D1, D2) fed from a single local oscillator LO1. FIG. 1A shows that the same arrangement applies to the converters DC3, DC4 which are fed from a single local oscillator LO2. This is because there are two receive antennas ANT(R) and ANT(T/R) that supply signals in the same 250 MHz sub-band and which can therefore be converted by the same conversion frequency. FIG. 1A shows that for each 250 MHz sub-band only one of the two antennas is selected by switches S on the output side of the input multiplex filters IMUX to feed the channel amplifiers shown in FIG. 1B.

FIG. 3 also shows how the redundancy of the frequency converters is achieved by a standard architecture providing three identical frequency conversion channels for a sub-band to be treated by each block of converters DC1, DC2, ... with a C2/3 redundancy ring at the input and a C3/2 redundancy ring at the output of each converter unit. One output of each C3/2 redundancy ring supplies a signal corresponding to the polarization X processed by the circuit shown in FIGS. 1A and 1B; the other output corresponds to the polarization Y for which there is a similar circuit that is not shown in order to keep the diagram simple.

All these components are connected in series in the conventional way via coupling and signal routing means comprising, for example, redundant rings (C0, C1, C2, C2/3, C3/2), waveguides (no reference number), 3 dB couplers, switches S, et cetera, to enable signals to be routed correctly and to confer some ruggedness on the payload in the event of failure of a number of critical components of the system, by implementing redundancy in respect of such components, together with switching or coupling means for bringing them into use as necessary.

FIG. 1A stops at the 12/16 redundancy ring and its 16 outputs. The diagram is sectioned at this point, as shown by the arrows A-A', which link to the arrows with the same labels in FIG. 1B, this description of the prior art continuing with a description of the second part of one example of a standard payload architecture for a large number of channels.

Thus, starting from the first 12/16 redundancy ring in FIG. 1A, there are 16 variable gain channel amplifiers CAMP1, CAMP2, . . . , CAMP16 the outputs of which are connected via series-connected noise reduction filters NRF1, NRF2, . . . , NRF16 to the inputs of respective power amplifiers HPA1, HPA2, . . . , HPA16. The signals at the outputs of these power amplifiers are then fed to 18 channel filters OMUX via a second 16/12 redundancy ring. In the example shown, six of these filters OMUX are fed directly from the six outputs of the 16/12 redundancy ring; the other 12 filters OMUX are fed from six other outputs of the 16/12 redundancy ring via six switches S so that six of the 12 OMUX filters can be fed. The signals are then routed to the transmit antenna(s) ANT(T) or transmit/receive antenna(s) ANT(T/R), possibly via other bandpass filters (DI1, TX, . . . ).

This standard architecture causes various problems when used for a payload including a large number of channels and a large number of frequency conversions, some of which are outlined below: a multiplicity of mixing spuriae; a high level of crosstalk; channels blocked by interference; amplification of a plurality of channels at different levels in the same mixer, the operation of which can be optimized for only one of the channels, unless performance is compromised. Moreover, this architecture is not optimized for an implementation with a high level of integration of its various functional components.

SUMMARY OF THE INVENTION

An object of the invention is to overcome the drawbacks of the prior art.

To this end, the invention proposes a satellite payload architecture with d transparent channels chosen from C channels (c≧d at the antenna) each channel having a bandwidth δ, said payload comprising a receive part fed by at least one receive antenna and a transmit part feeding at least one transmit antenna, said payload further comprising a first plurality g of band-pass channel filters IMUX of bandwidth δ that filter signals received by said receive part, frequency converter means, a plurality k of channel amplifiers (k≧d), power amplifier means and a second plurality p of channel filters OMUX that filter the signals amplified by said plurality k of channel amplifiers and said power amplifier means, said k channel amplifiers being coupled to said p channel filters by redundant means in order to assign the d amplifiers to said d channels, said frequency converter means comprising at least one mixer and at least one source of a conversion frequency signal, characterized in that said g band-pass channel filters IMUX filter said signals received before frequency conversion by said converter means.

In another advantageous embodiment, said satellite payload with d transparent channels each having a bandwidth δ, said payload comprising a receive part fed by at least one receive antenna and a transmit part feeding at least one transmit antenna, said payload further comprising a first plurality g of band-pass channel filters IMUX of bandwidth δ that filter signals received by said receive part, frequency converter means, a plurality k of variable gain channel amplifiers (k≧d), power amplifier means and a second plurality p of channel filters OMUX that filter the signals amplified by said plurality k of channel amplifiers and said power amplifier means, said k channel amplifiers being coupled to said p channel filters by redundant means in order to assign d amplifiers to said d channels, said frequency converter means comprising at least one mixer and at least one source of a conversion frequency signal, is characterized in that said k variable gain channel amplifiers are respectively associated with k frequency converter devices, each converter device comprising at least one mixer and at least one source of a conversion frequency signal, and in that the k output of said k channel amplifiers are respectively coupled to the k inputs of said frequency converter devices.

In accordance with another feature, said frequency converter means comprise at least one switch and at least one signal source supplying g signals at g different conversion frequencies, said switch being coupled to said source(s) and to said mixer in order to select a conversion frequency from said g frequencies and to supply it to said mixer.

In one embodiment, said at least one mixer is a wideband mixer capable of operating correctly over all of the bandwidth of said payload, i.e. over a bandwidth>dδ.

In another embodiment, said k frequency converter devices comprise at least first and second mixers and at least two sources of two conversion frequency signals so as to effect at least two frequency conversions for each channel. In an advantageous embodiment, said at least two frequency sources are correlated local oscillators. In accordance with another feature, said correlated local oscillators are frequency synthesizer local oscillators each adapted to supply a signal at a frequency selected from a plurality c of possible frequencies, and said correlated frequency synthesizer local oscillators being adapted to be controlled from the ground by telecontrol signals (TC1, . . . , TC16), said payload further comprising means for receiving a control signal from the ground and means for applying said control signal to said correlated local oscillators, said at least two correlated frequency synthesizer local oscillators being coupled to said source(s) and to said mixers in order to select first and second conversion frequencies from said c frequencies and to supply them to said mixers.

In a particularly advantageous embodiment a surface acoustic wave filter (SAW1, . . . , SAW16) is disposed between said at least two mixers and before said variable gain channel amplifier in order to apply channel filtering by said SAW filters before said second mixer.

In one particular embodiment the invention proposes a telecommunication satellite payload adapted to convey a large number d of transparent channels, said payload being adapted to receive uplink signals consisting of radio waves in a first frequency band having a first center frequency and a first bandwidth and to transmit downlink signals consisting in radio waves in a second frequency band having a second center frequency and a second bandwidth, said second center frequency being different from said first center frequency; said payload including:

at least one radio antenna adapted to receive and/or to transmit radio waves;
a plurality e of input filters,
a plurality f of low-noise amplifiers,
a plurality g of demultiplexing filters IMUX,
a plurality h of frequency converters,
a plurality j of local oscillators,
a plurality k of channel amplifiers,
a plurality m of noise reduction filters,
a plurality n of power amplifiers,
a plurality p of filters OMUX, and
coupling and signal routing means; characterized in that the various components listed above are disposed and connected by said coupling and signal routing means in such manner as to effect channel filtering of said signals by said g filters IMUX before first frequency conversion of said signals by said h frequency converters.

In accordance with an advantageous feature, the number h of frequency converters is at least equal to the number d of channels: h≧d.

In a preferred embodiment, each local oscillator can supply a plurality g of conversion frequencies one of which can be selected by a switch associated with each local oscillator, said switch being configurable on command.

In an advantageous embodiment, said payload further comprises means for receiving a control signal from the ground and means for applying said control signal to said switch(es) in order to command the configuration of the latter.

In accordance with one feature, said frequency converters are wide-band converters adapted to convert any channel from any channel frequency in said first frequency band to any channel frequency in said second frequency band subject to application to said converter of an appropriate conversion frequency supplied by one of said local oscillators in response to a command applied to said switch associated with said local oscillator.

In one particularly advantageous embodiment, said k channel amplifiers are physically associated with said h frequency converters and h=k. In a preferred embodiment, said k amplifiers and said h=k frequency converters are MMIC and are integrated into a channel amplifier/frequency converter device.

In another embodiment, said k channel amplifiers are variable gain amplifiers. In accordance with one feature, said k variable gain amplifiers are disposed and connected by said coupling and signal routing means to the inputs of said h frequency converters in such manner as to effect the channel amplification before effecting said frequency conversion.

In another embodiment said payload further includes digital signal processing means including a plurality r of analog-digital converters, digital filter means and a plurality r of digital-analog converters. These digital processing means are advantageously disposed and connected by said coupling and signal routing means in such manner as to effect said digital processing after said first frequency conversion. In one embodiment said digital processing means further comprise frequency converter means adapted to effect a second frequency conversion before the digital-analog conversion by said plurality r of digital-analog converters.

In one specific embodiment said j local oscillators are frequency synthesizer oscillators.

In one particularly advantageous embodiment the various components are mechanically integrated channel by channel, each channel including at least one linearizer, one frequency converter, one channel amplifier and one power amplifier together with the conditioned electrical power supply necessary for correct functioning of the system as a whole.

Other features and advantages of the invention will emerge from a reading of the following detailed description with reference to the appended drawings, in which:

BRIEF DESCRIPTION OF THE DRAWINGS

FIG. 1A, already mentioned, is a diagram showing a first part of a conventional payload architecture for a large number of channels, which connects to FIG. 1B at the arrows A-A';

FIG. 1B, already mentioned, is a diagram showing a second part of a conventional payload architecture for a large number of channels, which connects to FIG. 1A at the arrows A-A';

FIG. 2A is a diagram showing a first part of a payload architecture of the invention for a large number of channels, which connects to FIGS. 2B, 2C and 2D at the arrows B-B';

FIG. 2B is a diagram showing a second part of a payload architecture of the invention for a large number of channels, which connects to FIG. 2A at the arrows B-B';

FIGS. 2C and 2D are diagrams showing other embodiments of a second part of a payload architecture of the invention for a large number of channels, which respectively connect to FIG. 2A at the arrows B-B';

DESCRIPTION OF PREFERRED EMBODIMENTS

Figure 2D:
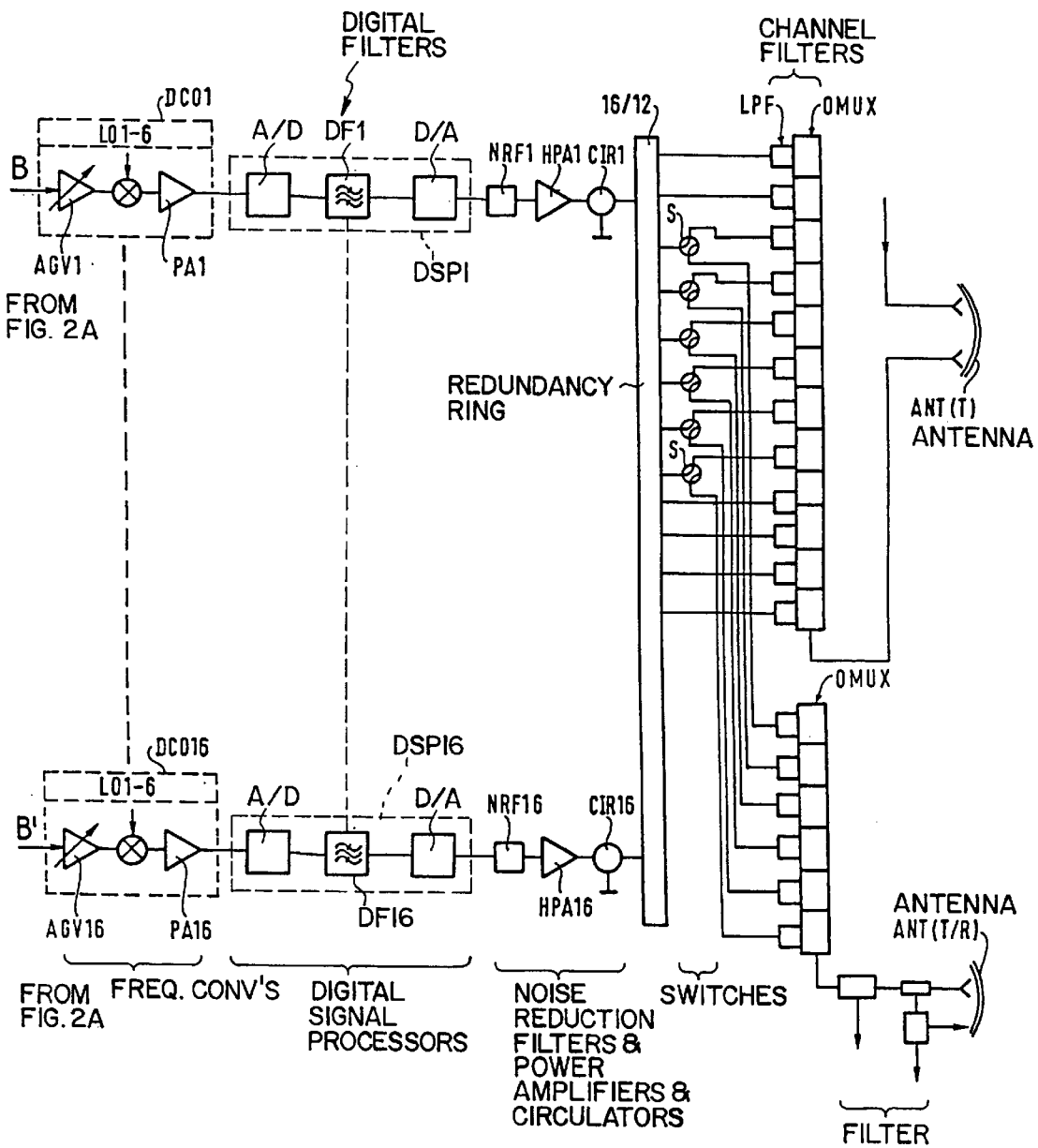
Figure 3:
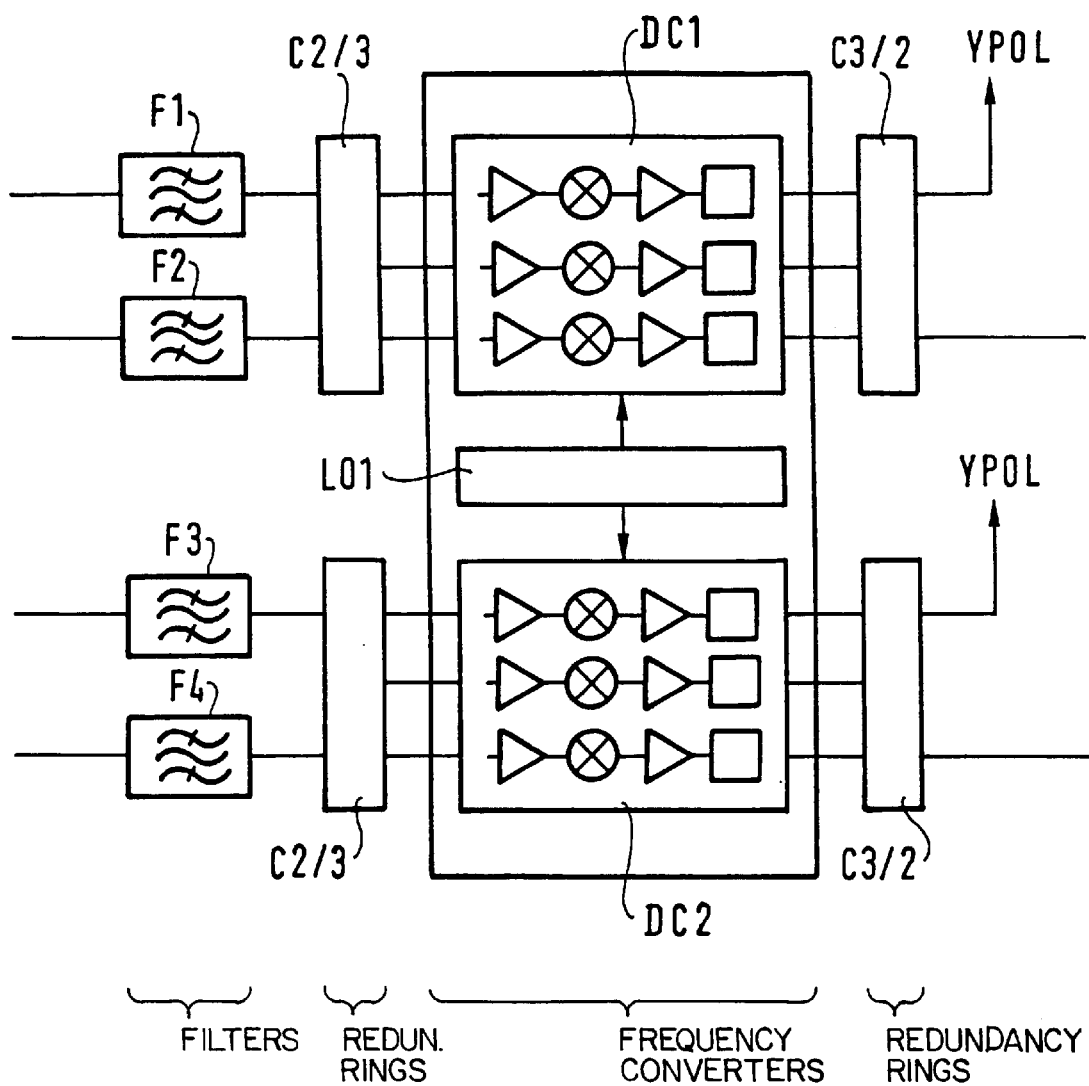
FIG. 3, already described, is a diagram showing part of FIG. 1A comprising a block of prior art frequency converters with its associated local oscillators.

The same reference symbols denote the same components in all the figures. To keep the diagrams simple the scale is not always the same. The drawings show non-limiting examples of embodiments of the invention to show the main features of the invention.

FIGS. 1A and 1B have already been described with reference to the main functional units of a payload of conventional design.

FIG. 2A is a diagram showing a first part of a payload architecture of the invention for a large number of channels which connects to FIG. 2B at the arrows B-B'.

As in FIG. 1A, and to enable direct comparison with the latter figure, the number of channels to be conveyed is 24 in the example shown (12 with each polarization XPOL, YPOL). Like the prior art payload, that of FIG. 2A has receive and transmit/receive antennas which feed received radio signals to the low noise amplifier block LNA comprising input filter means, redundancy rings providing redundant channels, et cetera.

The differences between the invention and the prior art begin to emerge on the output side of the low noise amplifier blocks LNA: the signals are routed directly to the band-pass channel filter banks IMUX. As in the previous figure, FIG. 2A shows the components of the payload for one polarization only (YPOL), parallel channels being provided for the crossed polarization XPOL, now from the output side of the low-noise amplifier blocks LNA.

The input signals are channeled by the demultiplexing filters IMUX without pre-selection filtering and at the input frequency prior to any frequency conversion. The number of filters IMUX corresponds to the number of channels for the receive antenna ANT(R), i.e. 12 for each polarization. The number of filters IMUX for the transmit/receive antenna is half this for each polarization, i.e. six. Switches S select which of the two antennas ANT(R), ANT(T/R) is used for a channel that can be fed by both.

After multiplex filtering IMUX and antenna selection by the switches S, the signals are routed into a 12/16 redundancy ring as in the prior art, at which point we reach the arrows B-B' that link to FIG. 2B, with reference to which the description continues.

FIG. 2B is a diagram showing a second part of a payload architecture of the invention for a large number of channels and connects to FIG. 2A at the arrows B-B'. The signals arrive from the 12/16 redundancy ring on 16 channels that are connected to the inputs of the 16 frequency converter devices DCO1, DCO2, . . . , DCO16. In an advantageous embodiment of the payload of the invention these frequency converter devices are integrated and can be fabricated in the MMIC technology, for example.

Each frequency converter device (DCO1, . . . , DCO16) has its own means for generating the conversion frequency, for example a local oscillator (LO1–6). Each frequency converter device comprises a mixer for mixing the signal whose frequency is to be converted with the signal from the local oscillator to effect the frequency conversion. Each frequency converter device advantageously comprises amplifier means which, in a preferred embodiment, are integrated with the frequency conversion means (mixer, local oscillator). The amplifier means advantageously constitute the channel amplifiers that are needed to supply a pre-amplified signal to the power amplifiers HPA1, HPA2, . . . , HPA16.

It is highly advantageous to provide a variable gain amplifier on the input side of the mixer in the integrated frequency converter device. This way the signal level applied to the mixer can be kept virtually constant, which avoids problems caused by disparate signal levels on the various channels and in particular noise problems (mixing spuriae). FIG. 2B shows an example of this preferred configuration with the variable gain amplifier (AGV1, AGV2, . . . AGV16) on the input side of the mixer, which is followed by a pre-amplifier PA1, PA2, . . . , PA16. In a preferred embodiment said pre-amplifier is also integrated with the variable gain amplifier, the mixer and the local oscillator to produce an integrated frequency converter.

FIG. 2C shows a final advantageous feature: this is the use of a local oscillator capable of generating a plurality of separate frequencies, with a switch for selecting one of these. In FIGS. 2B, 2C and 2D examples the FIG. 2B example, a frequency source is used that is capable of supplying a signal in a very wide band, with a switch SW, as shown in FIG. 2C example for choosing which frequency in said band will actually be used for the requirements of the system. This has at least two decisive advantages: the frequency converter device is then the same for all channels (DCO1=DCO2=DCO3= . . . =DCO16), which greatly simplifies industrial scale fabrication, and reconfigurability of the system during its useful life. Said configurable switches, as shown in FIG. 2C example are configured by application of an external switching command. All that is required is to provide the payload with specific means for interpreting and then acting on commands sent from the ground, and the payload becomes reconfigurable for missions that were not scheduled at the time the satellite was launched.

The remainder of FIG. 2B is similar to the corresponding part of FIG. 1B, i.e. is of conventional design. The outputs of the frequency converters DOC1, DOC2, . . . , DCO16 are connected via noise reducing filters NRF1, NRF2, . . . , NRF16 in series to the inputs of the respective power amplifiers HPA1, HPA2, . . . , HPA16. The power signals from these power amplifiers are then conveyed via a second 16/12 redundancy ring to 18 channel filters OMUX. In the example shown, six of these filters OMUX are fed directly from six outputs of the 16/12 redundancy ring; the other 12 filters OMUX are fed from six other outputs of the 16/12 redundancy ring via six switches S which feed six of the 12 filters OMUX. The signals are then routed to the transmit antenna(s) ANT(T) or transmit/receive antenna(s) ANT(T/R), possibly via other band-pass filters.

Figure 4:
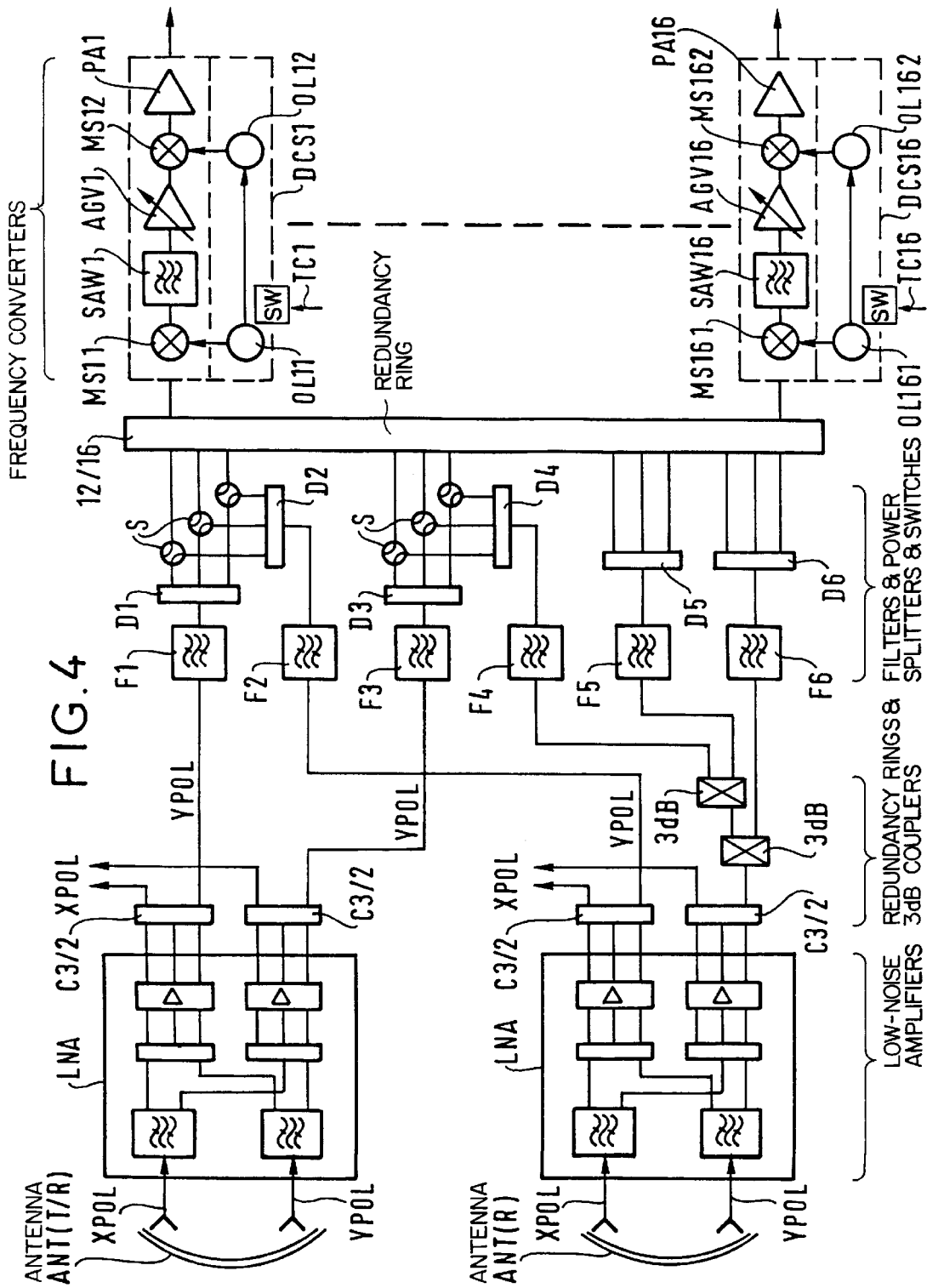
FIG. 4 is a diagram showing part of another embodiment of the invention in which the channel filtering is effected by a surface acoustic wave filter incorporated in the frequency converter means, comprising means for effecting two frequency conversions.

FIG. 4 is a diagram showing part of another embodiment of the invention in which the channel filtering is effected by a surface acoustic wave filter (SAW1, . . . , SAW16) incorporated into the frequency converter means (DCS1, . . . , DCS16), comprising means for effecting two frequency conversions.

As in the previous figures, and to enable direct comparison with the latter figures, the number of channels to be conveyed is 24 in the example shown (12 with each polarization XPOL, YPOL). Like the prior art payload, that of FIG. 4 has receive and transmit/receive antennas which supply received radio signals to the low-noise amplifier blocks LNA comprising input filtering means, redundancy rings providing redundant channels et cetera.

Starting from the low-noise amplifier units LNA, the FIG. 4 example comprises a block of pre-selector filters (F1, F2, . . . , F6) to split the received signals into 250 MHz frequency bands. The filtered signals are then supplied to power splitters (D1, D2, . . . , D6) which are connected by matrices of switches S to the 12/16 redundancy ring.

It is at this point that the differences between this embodiment of the invention and the prior art begin to emerge: the signals are routed directly to the frequency converter means (DCS1, . . . , DCS16) without passing first through banks of band-pass channel filters IMUX. As in the previous figures, FIG. 4 shows the components of the payload for only one polarization (YPOL), parallel channels being provided for the cross-polarization XPOL, now from the output side of the low-noise amplifier blocks LNA.

The input signals are therefore channeled by the surface acoustic wave filters (SAW1, . . . , SAW16) integrated into the frequency converter means, after a first frequency conversion effected by a first mixer (MS11, . . . , MS161) and a first local oscillator (OL11, . . . , OL161). The number of SAW filters thus corresponds to the number of channels for the receive antenna ANT(R), i.e. 12 for each polarization, increased by the number of redundant channels, i.e. four in this example. As in FIG. 2A, the number of filters IMUX for the transmit/receive antenna is half this for each polarization, i.e. six increased by the number of redundant channels, i.e. four in this example. The redundant channels can be assigned indifferently to either antenna. As in the previous figures switches S select which of the two antennas ANT(R), ANT(T/R) is used for a channel that can be fed by both.

After filtering by the SAW filters, the signals are routed to the 16 frequency converter devices DCS1, DCS2, . . . , DCS16.

Each frequency converter device (DCS1, . . . , DCS16) has its own means for generating the conversion frequencies, for example two local oscillators (OL11, OL12, . . . , OL161, OL162). In FIG. 4, each frequency converter device comprises two mixers for mixing the signal whose frequency is to be converted with the signal from the respective local oscillator to effect the frequency conversion. Each frequency converter device advantageously further comprises amplifier means which, in a preferred embodiment, are integrated with the second frequency converter means (mixer, local oscillator) in each frequency converter device (DCS1, . . . , DCS16). These amplifier means advantageously constitute the channel amplifiers that are needed to supply a pre-amplified signal to the power amplifiers (HPA1, HPA2, . . . , HPA16, not shown in this figure).

As already mentioned in the description of FIG. 2B, it is highly advantageous to provide a variable gain amplifier (AGV1, . . . , AGV16) on the input side of the second mixer (MS12, . . . , MS162) in the frequency converter device. In this way the signal level applied to the second mixer can be kept virtually constant, which avoids problems caused by disparate signal levels on the various channels, and in particular noise problems (mixing spuriae). FIG. 4 shows one example of this preferred configuration with the variable gain amplifier (AGV1, AGV2, . . . , AGV16) on the input side of the second mixer which is followed by a preamplifier PA1, PA2, . . . , PA16. In a preferred embodiment said preamplifier is integrated with the variable gain amplifier, the second mixer and the second local oscillator to form an integrated frequency converter.

FIG. 4 shows a final advantageous feature: this is the use of two correlated frequency synthesizer local oscillators capable of generating a plurality of separate frequencies adapted to be controlled by a command from the ground applied to the control input (TC1, . . . , TC16) provided for this purpose to choose two frequencies for the first and second frequency conversions. In the FIG. 4 example, TC1, . . . , TC16 are routed to switches SW. In the FIG. 4 example a frequency source is used capable of supplying a signal in a very wide band, with the possibility of choosing which frequency in said band is used for the requirements of the system, from around 12 possible frequencies, for example. As in the FIG. 2B embodiment, this has at least two decisive advantages: the frequency converter device is the same for all channels (DCS1,=DCS2=DCS3= . . . =DCS16) which greatly simplifies industrial scale fabrication, and the reconfigurability of the system during its useful life. Said frequency synthesizer oscillators can be configured by application of an external command. All that is required is to provide the payload with specific means for interpreting and then acting on commands sent from the ground and the payload becomes reconfigurable for missions that were not scheduled at the time the satellite was launched.

The remainder of the payload in FIG. 4 is similar to the corresponding part of FIGS. 1B, 2B and 2C, i.e. of conventional design, and is not shown in the drawing. For this reason the description of this common part will not be repeated here.

Although it is not shown in the FIG. 4 example, as in the example of FIGS. 2A, 2B and 2C it is naturally possible to replace various components of the payload of the invention with functionally equivalent digital electronics. For example, the local oscillators and associated switches can be replaced with frequency synthesizers.

Figure 5:
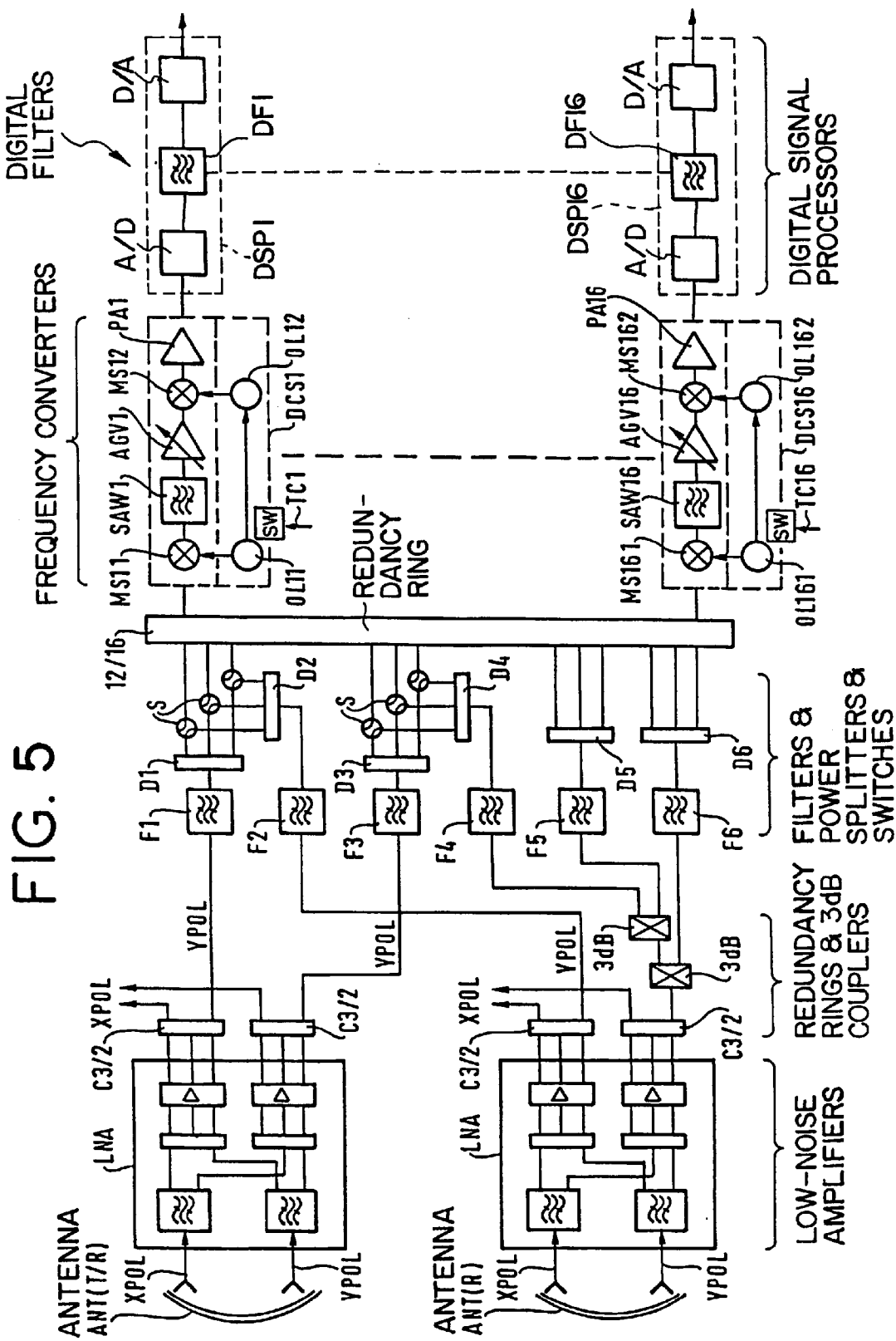

The filtering operations can also be carried out in the digital domain, subject to analog-digital conversion beforehand, as shown in FIGS. 2D and 5 examples. Both FIGS. 2D and 5 illustrate digital signal processors DSP1, . . . , DSP16 including analog-digital A/D and digital analog D/A converters. In FIGS. 2D and 5 examples, these digital signal processors also include digital filters DF1, . . . , DF16. Other digital signal processing may be considered without departing from the scope of the present invention.

A comparison of FIGS. 1B and 2B shows the important advantages in terms of reduced complexity, weight and overall size of the payload of the invention compared to a conventional payload design. By applying the IMUX filtering before the first frequency conversion the need for pre-selector filters is eliminated. The need for IMUX is eliminated for those channels that are not selected at the switches on the input side of the first 12/16 redundancy ring.

The C2/3 and C3/2 redundancy rings of the prior art are not needed in the payload of the invention. The integration of the frequency converters with their local oscillators, their variable gain channel amplifiers and their output pre-amplifiers improves compactness and reliability. In an embodiment in which the local oscillators are identical, with frequency selection by an associated switch, all the integrated frequency converters are identical, which simplifies their industrial fabrication.

The performance of the system is enhanced since the frequency converters operate on a single channel, rather than three contiguous channels. The mixing spuriae are considerably reduced, if not eliminated, and equalizing the signal level on each channel before frequency conversion in each individual channel improves the performance of the mixers.

An estimate of the weight and electrical power consumption of the two configurations of FIGS. 1A, 1B as compared with FIGS. 2A and 2B shows important savings in terms of power consumption and mass: for the frequency converters, the channel amplifiers, the IMUX filters and the associated redundancy switches alone, the mass of the conventional solution is estimated at 28 kg with a consumption of 176 W. The solution of the invention as shown in FIGS. 2A, 2B represents a mass of 16 kg with a consumption of 120 W.

The person skilled in the art will readily conceive other embodiments of the payload of the invention, by replacing one or more components with similar components, without departing from the scope of the invention, as defined by the following claims.

We claim:

1. In a satellite payload with d transparent channels chosen from c channels, wherein $c \geq d$ at an antenna, each of said d channels having a bandwidth $\delta$, said payload comprising:

a receive part fed by at least one receive antenna and a transmit part feeding at least one transmit antenna, a first plurality g of band-pass channel filters IMUX of bandwidth $\delta$ that filter signals received by said receive part, frequency converter means for generating a conversion frequency signal, a plurality k of channel amplifiers, wherein $k \geq d$, power amplifier means, and a second plurality p of channel filters OMUX that filter the signals amplified by said plurality k of channel amplifiers and said power amplifier means, said k channel amplifiers being coupled to said p channel filters by redundant means in order to assign d amplifiers to said d channels, said frequency converter means comprising at least one mixer and at least one signal source of said conversion frequency signal, the improvement wherein said frequency converter means further comprises at least one switch, such that said at least one signal source supplies g signals at g different conversion frequencies, and said switch is coupled to said one signal source and to said at least one mixer in order to select a selected conversion frequency from said g frequencies and to supply said selected conversion frequency to said at least one mixer, and said at least one mixer is a wide-band mixer which operates throughout a bandwidth $\geq d\delta$.

2. The satellite payload with d transparent channels according to claim 1, wherein said payload is adapted to receive a control signal from the ground and apply said control signal to said switch in order to command a configuration of the switch.

3. In a satellite payload with d transparent channels each of said d channels having a bandwidth δ, said payload comprising:

a receive part fed by at least one receive antenna and a transmit part feeding at least one transmit antenna, a first plurality g of band-pass channel filters IMUX of bandwidth δ that filter signals received by said receive part, frequency converter means for generating a conversion frequency signal, a plurality k of channel amplifiers, wherein k≧d, power amplifier means, and a second plurality p of channel filters OMUX that filter the signals amplified by said plurality k of channel amplifiers and said power amplifier means, said k channel amplifiers being coupled to said p channel filters by redundant means in order to assign d amplifiers to said d channels, said frequency converter means comprising at least one mixer and at least one signal source of said conversion frequency signal, the improvement wherein said payload further comprises:

a plurality of variable gain channel amplifiers respectively associated with said frequency converter means, d outputs of said variable gain channel amplifiers being respectively coupled to d inputs of said frequency converter means, and wherein said frequency converter means further comprises at least one switch, such that said at least one signal source supplies g signals at g different conversion frequencies, and said one switch is coupled to said at least one signal source and to said at least one mixer in order to select a selected conversion frequency from said g frequencies and to supply said selected conversion frequency to said at least one mixer, and said at least one mixer is a wide-band mixer which operates throughout a bandwidth≧dδ.

4. In a satellite payload with d transparent channels each of said d channels having a bandwidth δ, said payload comprising:

a receive part fed by at least one receive antenna and a transmit part feeding at least one transmit antenna for receiving and transmitting, respectively, signals consisting of radio waves, frequency converter means for generating a conversion frequency signal, a plurality k of channel amplifiers, wherein k≧d, power amplifier means, and a plurality p of channel filters OMNUX that filter the signals amplified by said plurality k of channel amplifiers and said power amplifier means, said k channel amplifiers being coupled to said p channel filters by redundant means in order to assign d amplifiers to said d channels, said frequency converter means comprising at least one mixer and at least one signal source of said conversion frequency signal, the improvement wherein said payload further comprises:

a plurality of variable gain channel amplifiers respectively associated with a plurality k of frequency converter devices of said frequency converter means, each of said k frequency converter devices comprising a first and a second mixers and a first and a second sources of a first and a second frequency conversion signals, respectively, thereby effecting at least two frequency conversions for each of said d channels, d outputs of said variable gain channel amplifiers being respectively coupled to d inputs of said k frequency converter devices, and wherein said frequency converter means further comprises at least one switch, at least one of said first and second sources, of said first and second frequency conversion signals, supplies g signals at g different conversion frequencies, said at least one mixer is a wide-band mixer which operates throughout a bandwidth≧dδ, and said switch is coupled to said at least one of said first and second sources and to one of said first and second mixers in order to select a selected conversion frequency from said g frequencies and to supply said selected conversion frequency to said one of said first and second mixers.

5. The satellite payload with d transparent channels according to claim 4, wherein said first and second sources of said first and second frequency conversion signals are correlated local oscillators.

6. The satellite payload with d transparent channels according to claim 5, wherein said correlated local oscillators are frequency synthesizer oscillators.

7. The satellite payload with d transparent channels according to claim 6, wherein said frequency synthesizer oscillators are each adapted to supply a signal at a frequency selected from a plurality c of possible frequencies, and said frequency synthesizer oscillators are adapted to be controlled from the ground by telecontrol signals, said satellite payload further comprising means for receiving a control signal from the ground and means for applying said control signal to said correlated local oscillators, and said frequency synthesizer oscillators being coupled to said at least one of said first and second sources and to said first and second mixers in order to select a selected first and a selected second conversion frequencies from said plurality c of possible frequencies and to supply said selected first and selected second conversion frequencies to said mixers.

8. The satellite payload with d transparent channels according to claim 4, wherein a surface acoustic wave filter is disposed between said first and second mixers and before said variable gain channel amplifiers in order to apply channel filtering by said surface acoustic wave filter before said second mixer.

9. The satellite payload as claimed in claim 4, further comprising:

a plurality f of low-noise amplifiers coupled to said receive and transmit parts, wherein signals output from said low-noise amplifiers are delivered to said frequency converter means, without band-pass filtering.

10. The satellite payload with d transparent channels according to claim 4, wherein said payload further includes digital signal processors including a plurality r of analog-digital converters, digital filters and a plurality r of digital-analog converters.

11. A telecommunication satellite payload adapted to convey a large number d of transparent channels, said payload being adapted to receive uplink signals comprising radio waves in a first frequency bands having a first center frequency and a first bandwidth and to transmit downlink signals comprising radio waves in a second frequency bands having a second center frequency and a second bandwidth, said second center frequency being different from said first center frequency; said payload comprising:

at least one radio antenna adapted to receive and/or to transmit said radio waves in said first frequency and second frequency bands;

a plurality e of input filters, a plurality f of low-noise amplifiers, a plurality g of demultiplexing filters IMUX, a plurality h of frequency converters, a plurality i of local oscillators, a plurality k of channel amplifiers, a plurality m of noise reduction filters, a plurality n of power amplifiers, a plurality p of filters OMUX, wherein said payload effects band pass channel filtering of said uplink and downlink signals by said g filters IMUX before first frequency conversion of said uplink and downlink signals by said h frequency converters, the number of said h frequency converters is at least equal to the number of said d transparent channels: $h \geq d$, and at least one of said h frequency converters is a wide-band converter which converts any of said transparent channels from any first channel frequency in said first frequency bands to any second channel frequency in said second frequency bands subject to application to said wide-band converter of an appropriate conversion frequency.

12. The telecommunication satellite payload according to claim 11, wherein each of said i local oscillators is adapted to supply a plurality q of conversion frequencies, one of said q conversion frequencies being selected by a switch associated with said each of said i local oscillator, said switch being configurable on a command.

13. The telecommunication satellite payload according to claim 12, wherein said appropriate conversion frequency is supplied by one of said i local oscillators in response to said command applied to said switch associated with said one of said i local oscillators.

14. The telecommunication satellite payload according to claim 9, wherein said k channel amplifiers are physically associated with said h frequency converters and h=k.

15. The telecommunication satellite payload according to claim 14, wherein said k channel amplifiers and said h frequency converters are MMIC and are integrated into a channel amplifier/frequency converter device.

16. The telecommunication satellite payload according to claim 11, wherein said k channel amplifiers are k variable gain amplifiers.

17. The telecommunication satellite payload according to claim 16, wherein said k variable gain amplifiers are connected to the inputs of said h frequency converters in such manner as to effect channel amplification of said uplink and downlink signals before effecting said first frequency conversion.

18. The telecommunication satellite payload according to claim 11, wherein said payload further includes digital signal processors including a plurality r of analog-digital converters, digital filters and a plurality r of digital-analog converters.

19. The telecommunication satellite payload according to claim 18, wherein said digital iprocessors are advantageously disposed and connected within said payload to effect digital processing of said uplink and downlink signals after said first frequency conversion.

20. The telecommunication satellite payload according to claim 18, wherein said digital processors further comprise a second frequency converter adapted to effect a second frequency conversion before digital-analog conversion by said plurality r of digital-analog converters.

21. The telecommunication satellite payload according to claim 11, wherein said i local oscillators are frequency synthesizer oscillators.

22. The satellite payload as claimed in claim 11 wherein, said uplink and downiink signals are separated into respective frequency bands thus enabling individual treatment of each of said d transparent channels as a function of each of said respective frequency bands, and said separated uplink and downlink signals are delivered to said h frequency converters from said g filters IMUX, and the outputs of said h frequency converters are delivered to said p filters OMUX for routing to said radio antenna.

* * * * *